A. JUNGCLAS.
COFFEE-ROASTER.
No. 190,334. Patented May 1, 1877.
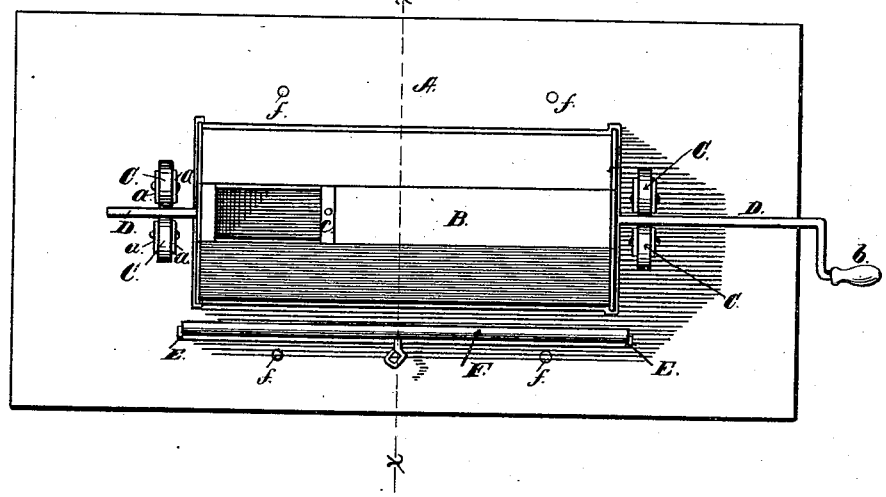
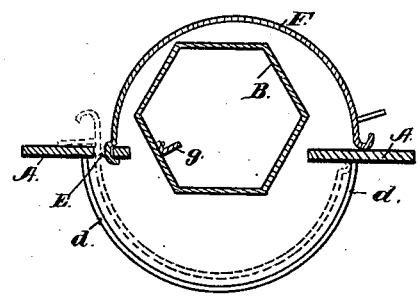

UNITED STATES PATENT OFFICE.

AUGUSTUS JUNGCLAS, OF DAYTON, OHIO.

IMPROVEMENT IN COFFEE-ROASTERS.

Specification forming part of Letters Patent No. 190,334, dated May 1, 1877; application filed March 6, 1877.

*To all whom it may concern:*

Be it known that I, AUGUSTUS JUNGCLAS, of Dayton, in the county of Montgomery and State of Ohio, have invented certain new and useful Improvements in Coffee-Roasters; and I do hereby declare the following to be a full, clear, and exact description of the same.

This invention relates to that class of coffee-roasters which are placed on the top of a stove after removing the plates and center piece, and which usually consists of a hollow hexagonal prism to contain the berries mounted upon a plate over a rectangular aperture therein, and provided with a crank-handle.

My improvement consists in the application of a novel sliding shield, so arranged that it may cover the revolving prism when the heat is not great, or be interposed between the prism and the fire, to act as a shield and prevent the burning of the coffee; also, in other details, all as will be herein specified.

Figure 1 represents a plan view of my improved coffee-roaster. Fig. 2 is a sectional view in elevation through the line *x x* of Fig. 1.

A represents a cast-metal plate of sufficient size to cover an opening made in the top of the stove by removing the center piece and the two front plates. This plate has a central rectangular portion removed from it, of a size large enough to admit the passage of a hexagonal prism, B, made of sheet metal. C C represent friction-rollers, journaled in bearings *a* at each end of the opening, as seen in Fig. 1. On these rollers rest the spindles D, which are secured axially to the ends of the prism in any suitable manner, and one of which is provided with a crank and handle, *b*, for revolving the prism. The prism is provided with a sliding door, *c*, by which the coffee may be placed in the prism and be withdrawn when roasted. E represents a longitudinal slot through the plate A, just to one side of this prism, and of about the same length. Through this slot is passed the semi-cylindrical shield F, of sheet metal, and sufficiently large to cover the prism. One edge of this shield is bent and flanged, as seen in Fig. 2, so that it can rest upon the edge of the slot E and be self-sustained. *d d* are two semicircular rods or wires riveted in the plate A, as seen by their ends at *f*, Fig. 1. These rods serve to hold the shield F when it is interposed between the fire and the prism, as represented by the dotted lines, Fig. 2, to prevent the too severe action of the heat. On the inside of the prism I secure, longitudinally, a right-angular strip of sheet metal, *g*, Fig. 2. One edge of this strip projects from the side of the prism, and serves to agitate the coffee and prevent the grains from adhering together.

I am aware that it is not new to submit coffee to the action of fire in a revolving prism mounted upon a plate with a central aperture.

What I claim is—

1. In a coffee-roaster, the semi-cylindrical shiftable shield F, arranged to cover the revolving coffee-receptacle, or be interposed between it and the fire, substantially as and for the purpose specified.

2. The herein-described coffee-roaster, consisting of the prism B, with its door *c* and strip *g*, and axial spindles D, mounted upon the friction-rollers C, that are supported in bearings on the plate A, and the shield F and rods *d d*, the whole constructed and united substantially as and for the purpose specified.

Witness my hand this 26th day of February, A. D. 1877.

AUGUSTUS JUNGCLAS.

Witnesses:
CHAS. M. PECK,
WM. RITCHIE.